US012258240B2

(12) United States Patent
Butler et al.

(10) Patent No.: US 12,258,240 B2
(45) Date of Patent: Mar. 25, 2025

(54) ASSEMBLY OF A HOLLOW RAIL IN AN ELEVATOR SHAFT OF AN ELEVATOR INSTALLATION

(71) Applicant: Inventio AG, Hergiswil (CH)

(72) Inventors: Erich Butler, Ebikon (CH); Romeo Lo Jacono, Gravesano (CH); Alessandro D'Apice, Ebikon (CH); Serge Strebel, Auw (CH); Peter Mori, Rothenburg (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/716,961

(22) PCT Filed: Dec. 1, 2022

(86) PCT No.: PCT/EP2022/083977
§ 371 (c)(1),
(2) Date: Jun. 6, 2024

(87) PCT Pub. No.: WO2023/110417
PCT Pub. Date: Jun. 22, 2023

(65) Prior Publication Data

US 2025/0051138 A1 Feb. 13, 2025

(30) Foreign Application Priority Data

Dec. 15, 2021 (EP) .................................... 21214831

(51) Int. Cl.
*B66B 7/02* (2006.01)
*B66B 5/00* (2006.01)
*B66B 19/00* (2006.01)

(52) U.S. Cl.
CPC .......... *B66B 19/002* (2013.01); *B66B 5/0087* (2013.01)

(58) Field of Classification Search
CPC .............................. B66B 19/00; B66B 5/0087
See application file for complete search history.

(56) References Cited

U.S. PATENT DOCUMENTS 6,991,070 B1 * 1/2006 Sanz Gamboa .......... B66B 7/02 187/408
7,444,732 B2 * 11/2008 Cruz ..................... B66B 19/002 187/408

(Continued)

FOREIGN PATENT DOCUMENTS

CN 108792884 A 11/2018
EP 2873640 A1 5/2015

(Continued)

*Primary Examiner* — Michael A Riegelman
(74) *Attorney, Agent, or Firm* — Shumaker, Loop & Kendrick, LLP; William J. Clemens

(57) ABSTRACT

A method for assembling a hollow rail for guiding an elevator car and/or a counterweight of an elevator installation includes: arranging a first and second hollow rail parts at different heights in an elevator shaft; aligning the first rail part relative to the second rail part by an alignment piece so that the first and second rail parts extend along a common longitudinal axis, wherein the alignment piece protrudes partially into an open end of the first rail part and partially into an open end of the second rail part; fastening one clamping element to each of the first and second rail parts; and applying a force to the clamping elements in opposite directions parallel to the common longitudinal axis to bring together the first and second rail parts, wherein the alignment piece is pressed into the open end of the first and/or the second rail part.

15 Claims, 3 Drawing Sheets

(56) References Cited

U.S. PATENT DOCUMENTS

| | | | | |
|---|---|---|---|---|
| 9,381,770 | B2 * | 7/2016 | Björni | B66B 7/026 |
| 9,592,997 | B2 * | 3/2017 | Mertala | B66B 19/002 |
| 9,751,728 | B2 * | 9/2017 | Mertala | E04G 3/246 |
| 10,723,591 | B2 * | 7/2020 | Kirsch | B66B 7/024 |
| 11,358,834 | B2 * | 6/2022 | Haag | B66B 7/026 |
| 11,365,095 | B2 * | 6/2022 | Haag | B66B 7/023 |
| 11,530,114 | B2 * | 12/2022 | Haag | B66B 7/024 |
| 2009/0223751 | A1 * | 9/2009 | Peacock | B66B 19/00 187/414 |
| 2010/0133048 | A1 * | 6/2010 | Barneman | B66B 19/00 187/414 |
| 2012/0263554 | A1 * | 10/2012 | Sanz Gamboa | B66B 7/026 411/81 |
| 2013/0056310 | A1 * | 3/2013 | Bjorni | B66B 7/02 187/408 |
| 2015/0314993 | A1 * | 11/2015 | Bolme | B66B 19/00 52/741.1 |
| 2016/0060078 | A1 * | 3/2016 | Mertala | B66B 19/002 52/741.1 |
| 2016/0083222 | A1 * | 3/2016 | Fernandez | B66B 7/026 29/446 |
| 2016/0311659 | A1 * | 10/2016 | Mertala | E04G 3/246 |
| 2018/0009633 | A1 * | 1/2018 | Fargo | B66B 7/022 |
| 2018/0079624 | A1 * | 3/2018 | Kirsch | B66B 11/0407 |
| 2018/0170712 | A1 * | 6/2018 | Fauconnet | B66B 7/026 |
| 2018/0297815 | A1 * | 10/2018 | Kirsch | B66B 19/002 |
| 2019/0055108 | A1 * | 2/2019 | Fauconnet | B33Y 80/00 |
| 2020/0377339 | A1 * | 12/2020 | Cambruzzi | G01C 15/004 |
| 2021/0016994 | A1 * | 1/2021 | Haag | B66B 7/026 |
| 2021/0016996 | A1 * | 1/2021 | Makinen | B66B 7/023 |
| 2021/0016997 | A1 * | 1/2021 | Haag | B66B 7/023 |
| 2021/0016998 | A1 * | 1/2021 | Haag | B66B 7/024 |
| 2021/0245998 | A1 * | 8/2021 | Lanz | B66B 19/00 |

FOREIGN PATENT DOCUMENTS

| | | | |
|---|---|---|---|
| EP | 3766817 | A1 | 1/2021 |
| EP | 3766818 | A1 | 1/2021 |
| EP | 3766819 | A1 | 1/2021 |
| EP | 3766820 | A1 | 1/2021 |
| WO | 2018234243 | A1 | 12/2018 |
| WO | 2020127787 | A1 | 6/2020 |

* cited by examiner

ASSEMBLY OF A HOLLOW RAIL IN AN ELEVATOR SHAFT OF AN ELEVATOR INSTALLATION

FIELD

The present invention relates to a method for assembling a hollow rail for guiding an elevator car and/or a counterweight of an elevator installation. Furthermore, the invention relates to a clamping tool for use in such a method.

BACKGROUND

An elevator installation can be used to transport persons and/or objects between floors of a building. For guiding an elevator car and/or a counterweight of the elevator installation along an elevator shaft, hollow rails with corresponding running surfaces and/or guide contours can be used, for example, which are anchored in the elevator shaft by corresponding clamps and can run vertically therein. Depending on the length of the elevator shaft, such hollow rails can be composed of a plurality of shorter hollow rail parts. To avoid disturbing noises and/or excessive wear during operation of the elevator installation, the hollow rail parts should be aligned to one another as precisely as possible, in particular such that an as flat as possible gap-free transition results at the hollow rail joints at which adjacent hollow rail parts abut.

EP 3 898 483 A1 (WO 2020/127787 A1) describes an example of a hollow guide rail of an elevator installation.

SUMMARY

There may therefore be a need for a method with which the assembly of a hollow rail in an elevator shaft can be improved. Furthermore, there may be a need for a clamping tool which can be (dis)assembled in a simple manner and which is suitable for use in such a method.

This need can be met by the subject matter of the advantageous embodiments defined in the following description, as well as the accompanying drawings.

A first aspect of the invention relates to a method for assembling a hollow rail for guiding an elevator car and/or a counterweight of an elevator installation. The method comprises at least the following steps, which can preferably be carried out in the order specified below: (i) arranging a first hollow rail part and a second hollow rail part at different heights in an elevator shaft of the elevator installation; (ii) aligning the first hollow rail part relative to the second hollow rail part by means of an alignment piece so that the first hollow rail part and the second hollow rail part extend along a common longitudinal axis, wherein the alignment piece is arranged between the first hollow rail part and the second hollow rail part such that the alignment piece partially protrudes into an open end of the first hollow rail part and partially into an open end of the second hollow rail part; (iii) fastening one clamping element to the first hollow rail part and one clamping element to the second hollow rail part; and (iv) applying a force to the clamping elements in opposite directions parallel to the common longitudinal axis to bring the first hollow rail part and the second hollow rail part together to form the hollow rail, wherein the alignment piece is pressed into the open end of the first hollow rail part and/or into the open end of the second hollow rail part.

An inner and/or outer contour of each of the hollow rail parts can fluctuate in terms of their dimensions due to production. Such deviations due to production can make assembling the hollow rail more difficult. To solve this problem, it is proposed to align the hollow rail parts with one another via a suitable alignment piece and to press them together. This makes assembling the hollow rail significantly easier and more precise. The use of a special clamping tool for the controlled application of the required assembly forces also makes assembly safer.

As indicated above, the first hollow rail part and the second hollow rail part can be brought together by means of the clamping elements until they abut against one another to form a hollow rail joint. As a result of the alignment piece being pressed at least partially into the open end of the first and/or the second hollow rail part, that is to say it sits without play in the corresponding open end, the hollow rail parts are aligned very precisely with respect to one another. A particularly smooth, gap-free transition between the hollow rail parts can thus be created so that in the most favorable case no additional post-processing is required. For example, the alignment can be so exact that the hollow rail joint does not need to be additionally ground in the region of the running surfaces and/or the guide contours, which considerably reduces the assembly effort.

"Hollow rail part" can be understood to mean an elongated, straight hollow profile which is open at its ends. For example, each hollow rail part may be formed from a correspondingly long piece of sheet metal or joined together from a plurality of correspondingly formed sheet metal pieces.

Each hollow rail part may have one or more guide contours which can serve, for example, to guide one or more guide shoes and/or brake shoes. Additionally or alternatively, each hollow rail part may have one or more running surfaces for rollers. The guide contours or running surfaces of different hollow rail parts should be aligned as congruently as possible, i.e., with the smallest possible offset relative to one another so that the finished assembled hollow rail has no excessive steps, gaps or other irregularities at its hollow rail joints, which could cause disturbing noises or vibrations during the movement of the elevator car and/or the counterweight or during actuation of the brake of the elevator installation or could increase the wear of the rollers.

It is possible for the first hollow rail part to be pre-assembled. In this case, a first longitudinal portion of the alignment piece may already have been inserted, for example pressed, into the open end of the first hollow rail part before the hollow rail is assembled. During alignment, a second longitudinal portion of the alignment piece, which projects beyond the open end of the first hollow rail part, can then be arranged in a certain orientation relative to the open end of the second hollow rail part and partially inserted there in this orientation. Finally, when the two hollow rail parts are brought together, the second longitudinal portion of the alignment piece can be pressed, for example up to a stop, into the open end of the second hollow rail part by applying a corresponding (pressing) force by means of the clamping elements. Thus, at the end of the assembly process, the alignment piece is pressed with the hollow rail at both sides.

It is also conceivable that, during the pre-assembly of the first hollow rail part, the first longitudinal portion of the alignment piece is only partially inserted, for example pressed, into its open end and is pressed completely into the open end of the first hollow rail part, for example, until it reaches the stop, only when the two hollow rail parts are brought together.

It is expedient if the clamping elements are fastened to the hollow rail parts in pairs opposite one another in the vertical direction. However, it is also conceivable for the fastened clamping elements to be assembled offset horizontally relative to one another. To prevent the hollow rail parts from becoming canted, it is advantageous if a plurality of clamping elements are fastened to different sides of the hollow rail parts, preferably to opposite sides of the hollow rail parts, and are the subjected to the force simultaneously or alternately.

The force can be applied manually, by means of a suitable tool, for example a wrench, and/or by a motor.

A second aspect of the invention relates to a clamping tool for use in a method as described above and below. The clamping tool comprises at least the following components: at least two clamping elements, wherein at least one first of the clamping elements can be fastened to a first hollow rail part and at least one second of the clamping elements can be fastened to a second hollow rail part; and a means for applying a force to the first clamping element fastened to the first hollow rail part and the second clamping element fastened to the second hollow rail part in opposite directions parallel to a common longitudinal axis of the first hollow rail part and the second hollow rail part so that the first hollow rail part and the second hollow rail part are moved toward one another.

Due to the limited space in the elevator shaft, the clamping elements can be designed, for example, particularly compactly, for example particularly slim or flat. Nevertheless, the clamping elements should be sufficiently robust so that enough force can be transmitted to the hollow rail parts to be able to completely bring them together, i.e., press them together.

The clamping elements can be releasably fastenable to the corresponding hollow rail part, for example, can be designed to be bolted and/or interlocked therewith.

For example, the clamping tool can be designed such that it can be carried, installed, and/or operated by a single person.

In the simplest case, the means for applying the force may be in the form of a threaded rod which is guided through both clamping elements. The clamping elements can, for example, be clamped between two nuts seated on the threaded rod, wherein the distance between the clamping elements can be reduced by corresponding tightening of one or both nuts.

However, other means for applying the force, for example in the form of a pneumatic or electrical actuator or a combination of different means, are also possible.

Such a clamping tool allows for a controlled bringing together of the hollow rail parts, even if high forces have to be applied for this purpose, which can be the case when the alignment piece is to be pressed into one or both hollow rail parts. The risk of damage to the hollow rail parts, on the one hand, and the risk of injury, on the other hand, can thus be reduced during assembly.

Without restricting the scope of the invention in any way, embodiments of the invention may be considered to be based, among other things, on the concepts and findings described below.

According to one embodiment, the clamping element can be hooked into the corresponding hollow rail part to fasten the clamping element to the corresponding hollow rail part. Accordingly, the clamping elements can also be unhooked again after the first hollow rail part and the second hollow rail part have been brought together to form the hollow rail, in particular after the hollow rail parts brought together to form the hollow rail have been fixed, for example, by means of a fixing piece (see below). This allows for a tool-free assembly of the clamping elements with just few steps. The assembly of the hollow rail can thus be further simplified.

According to one embodiment, the alignment piece can positively engage in each of the open ends to prevent the first hollow rail part from inadvertently rotating relative to the second hollow rail part about the common longitudinal axis. The alignment piece can thereby allow a displacement of the two hollow rail parts relative to one another along their common longitudinal axis. In other words, the hollow rail parts can be brought together over the alignment piece along their common longitudinal axis, wherein the alignment piece functions as a guide for the hollow rail parts. For example, the hollow rail parts can be brought together over the alignment piece such that the alignment piece disappears completely in the hollow rail. This embodiment allows for a very precise alignment of the two hollow rail parts without further aids.

According to one embodiment, the alignment piece may have a main body and at least one rib extending from the main body. The rib can positively engage in a groove of the first hollow rail part and in a groove of the second hollow rail part. The main body and the rib(s) may, for example, be made in one piece of the same material. However, a two-part or multipart design of the alignment piece is also possible, wherein the parts of the designed piece can be made of the same material or of different materials. Specifically, the rib or the ribs may be made, for example, of a softer material than the main body and/or the hollow rail parts. In this case, aluminum (alloy) may be a suitable material for the rib(s). However, it is also possible for the rib(s) and the main body to be made of aluminum (alloy) and/or another suitable material that is softer than the hollow rail parts. This embodiment makes it possible to generate a positive fit between the alignment piece and each hollow rail part that can also withstand higher torsional forces, with relatively low design effort.

According to one embodiment, at least three ribs can extend from the main body in different directions. Accordingly, the first hollow rail part and the second hollow rail part may each have a groove for each rib. The ribs can positively engage in the corresponding grooves of the first hollow rail part and in the corresponding grooves of the second hollow rail part. The stability of the positive fit between the alignment piece and each hollow rail part can thus be further improved.

According to one embodiment, the method may further comprise the following step: arranging an elongated fixing piece between the first hollow rail part and the second hollow rail part so that a first longitudinal portion of the fixing piece protrudes into the open end of the first hollow rail part and a second longitudinal portion of the fixing piece protrudes into the open end of the second hollow rail part; fixing the hollow rail parts brought together to form the hollow rail by means of the fixing piece, wherein the first hollow rail part is fixed to the first longitudinal portion and the second hollow rail part is fixed to the second longitudinal portion. The fixing piece may be designed as a tab, or fishplate, which in the simplest case may be designed in the form of a plate or a bracket. The fixing piece should have sufficient strength to be able to absorb the bending forces acting on the hollow rail joint during operation of the elevator installation without being excessively stressed and/or deformed thereby. The fixing piece may, for example, be made of steel or another metal alloy to meet this requirement. It is possible for the fixing piece to be fixed, for example bolted, to different longitudinal sides of the first and/or the second hollow rail part. It is also possible for the fixing piece, like the alignment piece, to be arranged completely within the hollow rail after the two hollow rail parts have been brought together. This embodiment allows for a permanent and stable fixing of the correctly aligned hollow rail parts.

According to one embodiment, the first hollow rail part can be fixed to the first longitudinal portion by bolting it to the first longitudinal portion. Additionally or alternatively, the second hollow rail part can be fixed to the second longitudinal portion by bolting it to the second longitudinal portion. The hollow rail parts brought together to form the hollow rail can thus be fixed in a simple manner without additional steps for fixing, such as a welding step, being required. In addition, the disassembly of the hollow rail is simplified.

According to one embodiment, the method may further comprise: removing the clamping elements after fixing. In other words, the clamping elements can be auxiliary tools which are used only temporarily during the installation of the elevator installation and are removed from the hollow rail during operation of the elevator installation.

According to one embodiment, the fixing piece can be held by the alignment piece. In other words, the fixing piece can be fastened to the first hollow rail part and/or to the second hollow rail part by the alignment piece. For example, the fixing piece can be held in the hollow rail exclusively by the alignment piece, as long as the fixing piece has not yet been fixed to the first and/or the second hollow rail part. The fixing of the hollow rail parts brought together to form the hollow rail can thus be considerably simplified.

According to one embodiment, the fixing piece can be held between the first longitudinal portion and the second longitudinal portion by the alignment piece. In other words, the alignment piece, viewed in the longitudinal direction of the fixing piece, can be fastened centrally to the fixing piece. This simplifies the insertion of the longitudinal portions into each hollow rail part.

According to one embodiment, the fixing piece can be interlocked with the alignment piece. In other words, the fixing piece and the alignment piece can be combined with one another by positive fit to form an assembly that can be handled as a unit. This allows for an uncomplicated pre-assembly. During the pre-assembly, the fixing piece can be fixedly connected to the hollow rail part. The alignment piece can thereby be held so that the alignment piece reliably reaches a central position on the hollow rail joint.

As mentioned above, according to one embodiment, the alignment piece may be made of a softer material, in particular a softer metal or a softer metal alloy than the first hollow rail part and/or the second hollow rail part. Excessive stress and/or deformation of the first and/or the second hollow rail part when the alignment piece is pressed in can thus be avoided.

In addition, the alignment piece may be made of a softer material than the fixing piece.

According to one embodiment, the alignment piece may be an aluminum part. This allows for cost-effective and precise production of the alignment piece. On the other hand, excessive stress and/or deformation of the first and/or second hollow rail part due to fitting inaccuracies can thus be avoided when the alignment piece is pressed in, especially since the hollow rail parts are generally made of steel (sheet metal). The deformation of the first and/or the second hollow rail part during assembly can thus be reduced such that the result is a nearly seamless transition at the hollow rail joint that does not require further post-processing.

In contrast, the fixing piece should be made of a material with significantly higher strength than aluminum, for example, of steel or another metal alloy. Forces that put stress on the hollow rail joint during operation of the elevator installation can thus be absorbed largely by the fixing piece, without it being stressed and/or deformed too much.

According to one embodiment, the first clamping element may be designed so as to be hooked into the first hollow rail part to fasten the first clamping element to the first hollow rail part. Additionally or alternatively, the second clamping element can be designed so as to be hooked into the second hollow rail part to fasten the second clamping element to the second hollow rail part. For this purpose, each hollow rail part may have, for example, a plurality of openings arranged distributed in the longitudinal direction of the hollow rail part for receiving a hook-shaped projection of the clamping element, for example, in the form of slots or elongated holes. The clamping element can thus be fastened in a simple manner, conveniently even without the aid of any tool, in a plurality of defined longitudinal positions on the corresponding hollow rail part.

Advantageous embodiments of the invention will be described below with reference to the accompanying drawings, wherein neither the drawings nor the description are intended to be interpreted as limiting the invention.

The drawings are merely schematic, and not to scale. Like reference signs refer in different drawings to like or analogous features.

DETAILED DESCRIPTION

Figure 1:
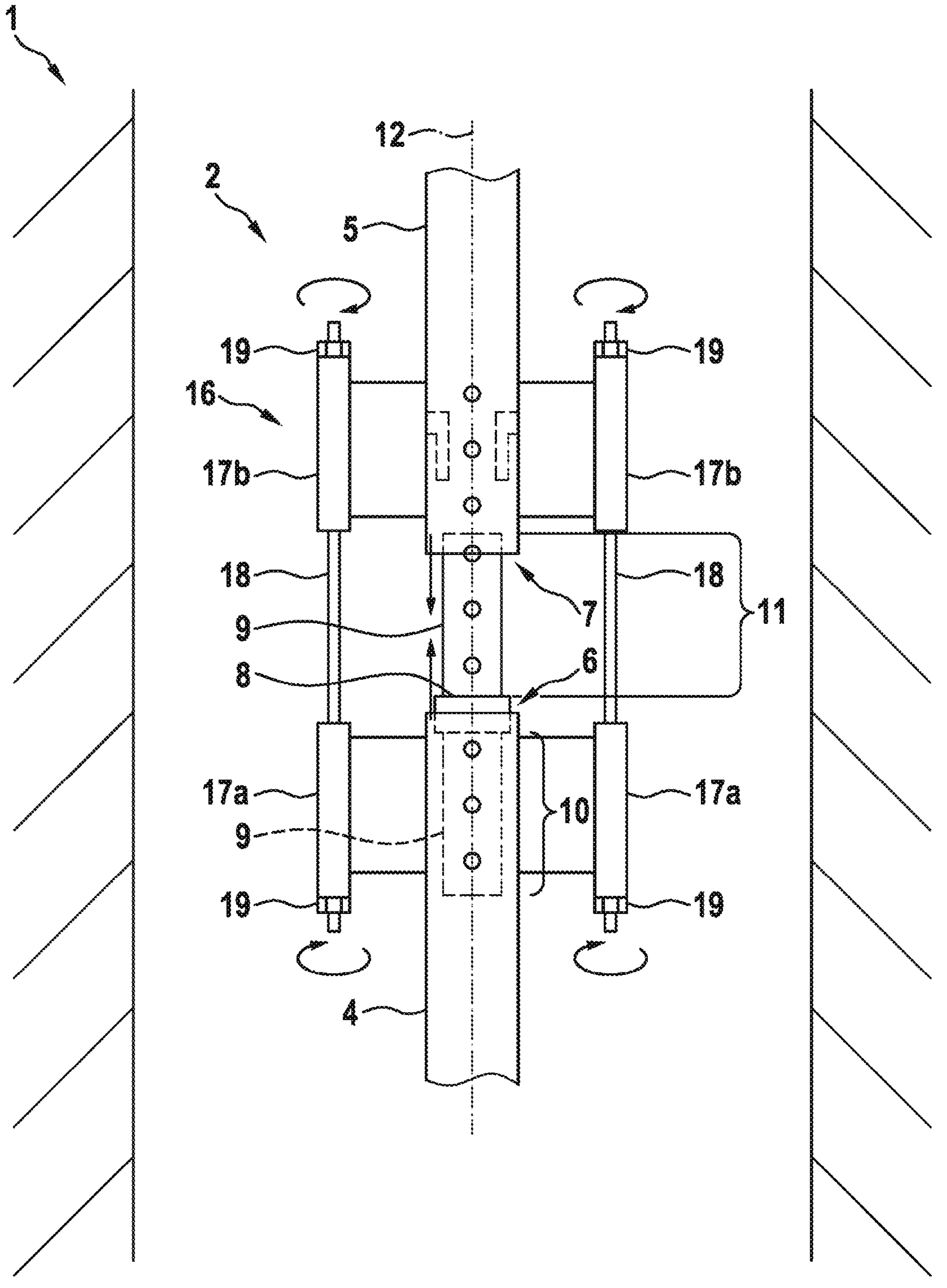
FIG. 1 shows the assembly of hollow rail parts in an elevator shaft in a method according to one embodiment of the invention using a clamping tool according to one embodiment of the invention.
Figure 2:
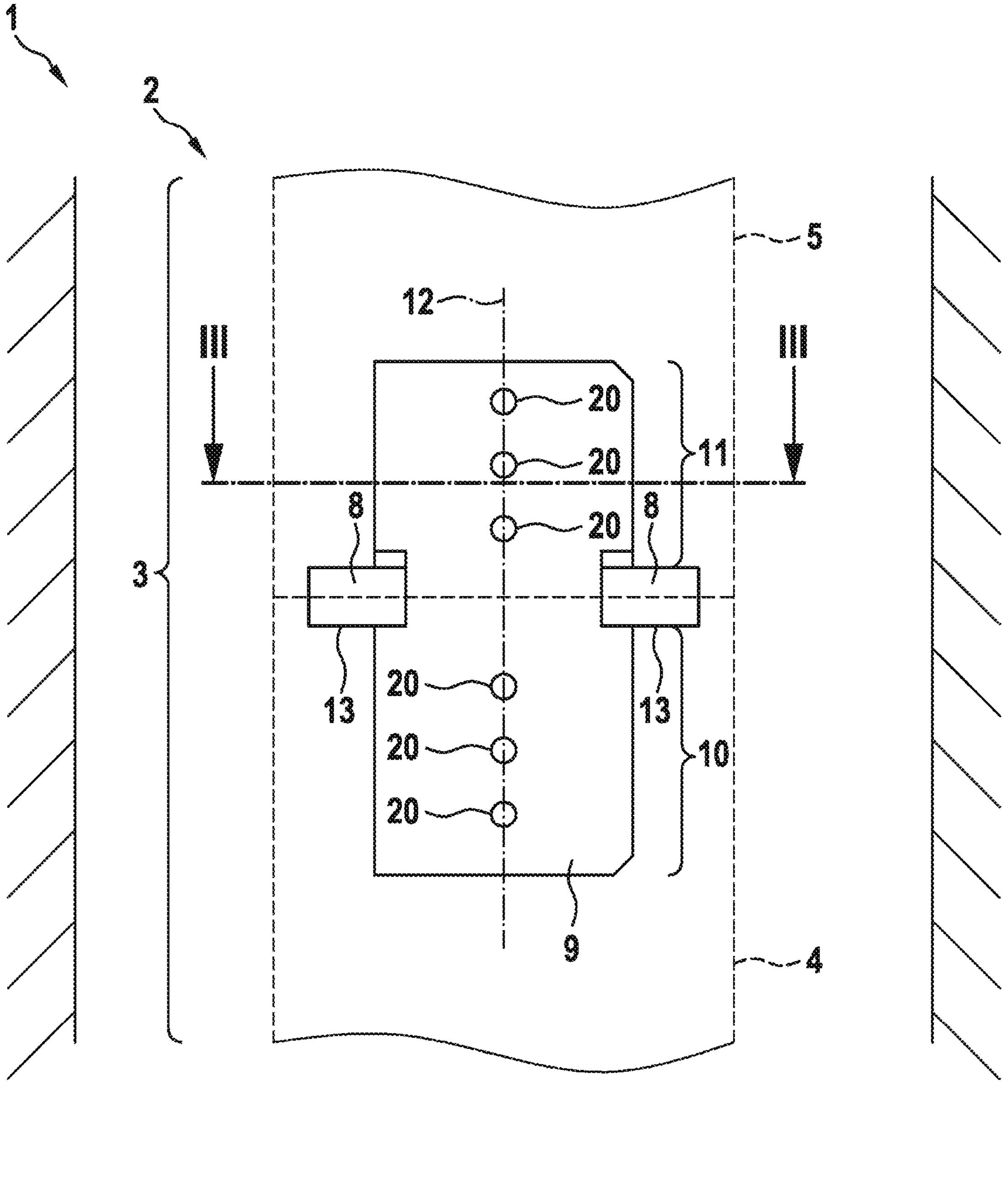
FIG. 2 shows a hollow rail which has been assembled from the hollow rail parts from FIG. 1.
Figure 3:
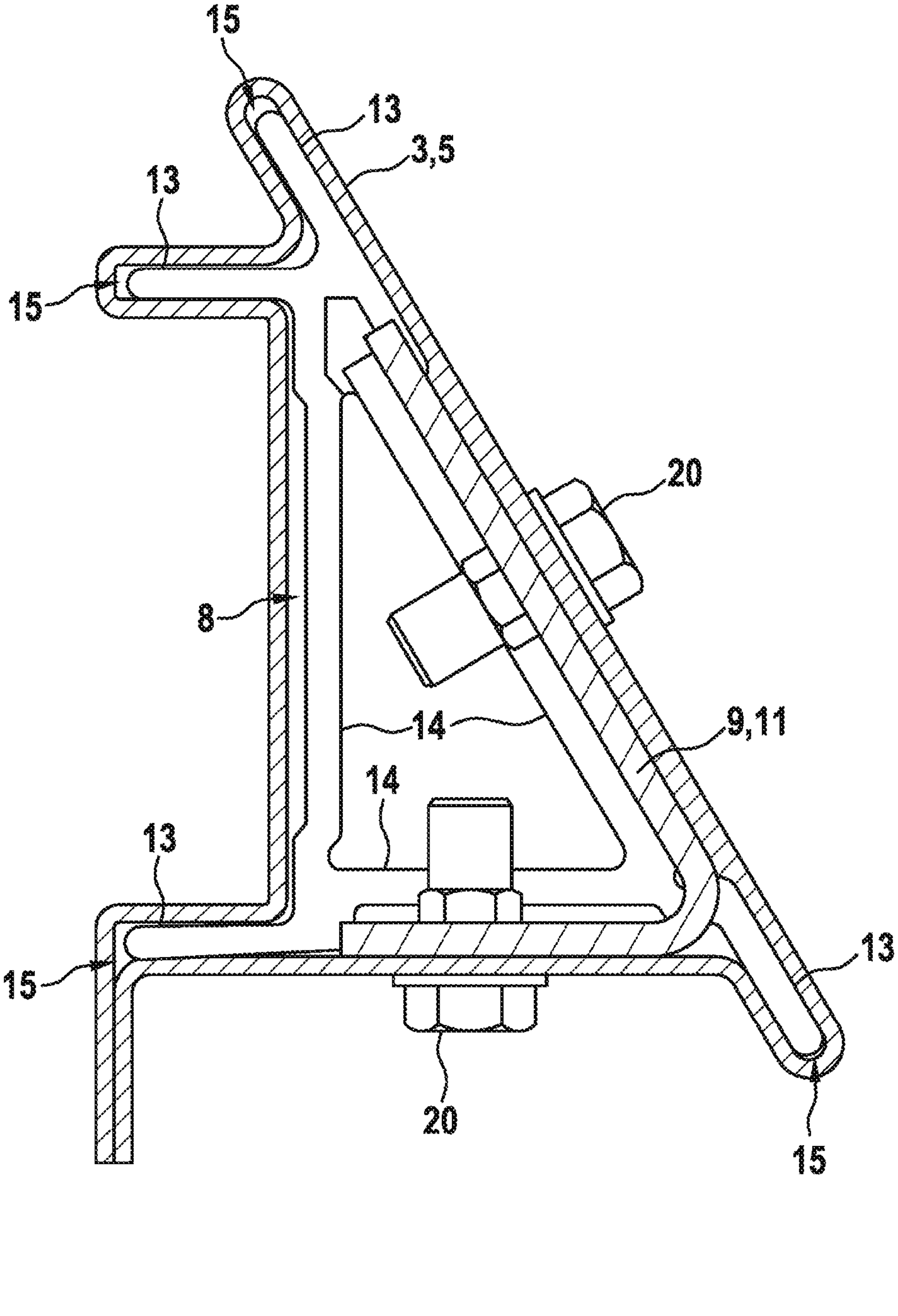
FIG. 3 shows a cross-sectional view of the hollow rail from FIG. 2 along a section line III-III.

FIG. 1 shows a portion of an elevator installation 1 which comprises an elevator shaft 2 in which one or more elevator cars (not shown) are to be moved between different floors of a building in the operative state of the elevator installation 1. To guide the elevator car(s), or a counterweight connected thereto, along the elevator shaft 2, one or more hollow rails 3 are assembled in the elevator shaft 2 in a method described in more detail below. FIG. 2 and FIG. 3 show a portion of such a hollow rail 3 after assembly.

In a first step, a first hollow rail part 4 and a second hollow rail part 5 are arranged at different heights in the elevator shaft 2, for example, by means of a crane. The hollow rail parts 4, 5 may, for example, be elongated hollow profiles with one or more guide contours and/or running surfaces.

The hollow rail parts 4, 5 can be arranged such that an open end 6 of the first hollow rail part 4 is opposite an open end 7 of the second hollow rail part 5.

In the open end 6 of the first hollow rail part 4, an alignment piece 8 may be inserted such that the alignment piece 8 partially projects beyond the open end 6.

For example, the alignment piece 8 may be partially pressed into the first hollow rail part 4.

In addition, an elongated, for example, plate-shaped or bracket-shaped fixing piece 9 may be pre-assembled on the first hollow rail part 4. The fixing piece 9 may, for example, be fastened exclusively by the alignment piece 8 to the open end 6 of the first hollow rail part 4, in particular such that a first longitudinal portion 10 of the fixing piece 9 protrudes into the open end 6, while a second longitudinal portion 11 of the fixing piece 9 projects beyond the open end 6.

To allow for simple (pre-)assembly, the alignment piece 8 can hold the fixing piece 9 centrally between the first longitudinal portion 10 and the second longitudinal portion 11.

In a second step, the two hollow rail parts 4, 5 are aligned with one another by means of the alignment piece 8 so that the two longitudinal axes of the hollow rail parts 4, 5 lie approximately on a common line which thus corresponds approximately to a common longitudinal axis 12 of the two hollow rail parts 4, 5.

This can be achieved, for example, by the second hollow rail part 5, here the upper hollow rail part, being lowered so far in the direction of the (lower) first hollow rail part 4 that a portion of the alignment piece 8 projecting beyond the open end 6 of the first hollow rail part 4 in the direction of the second hollow rail part 5 is partially inserted into the open end 7 of the second hollow rail part 5.

In this step, together with the alignment piece 8, the second longitudinal portion 11 of the fixing piece 9 can additionally be partially inserted into the open end 7 of the second hollow rail part 5.

To prevent unintentional rotation of the two hollow rail parts 4, 5 relative to one another about their common longitudinal axis 12, the alignment piece 8 can positively engage in a suitable manner in each of the open ends 6, 7.

As can be seen in FIG. 2 and FIG. 3, such a positive fit can be achieved, for example, by configuring the alignment piece 8 with a plurality of ribs 13, here four ribs, which can extend from a main body 14 of the alignment piece 8 in different directions transversely to the common longitudinal axis 12. For each rib 13, the hollow rail parts 4, 5 may have a groove 15 which can at least in the region of the open ends 6, 7 extend parallel to the corresponding longitudinal axis of the hollow rail parts 4, 5. On the one hand, each rib 13 engages in the groove 15 of the first hollow rail part 4 associated therewith, and on the other hand, in the groove 15 of the second hollow rail part 5 associated therewith.

For example, the alignment piece 8 can be pressed into the first hollow rail part 4 for the purpose of pre-assembly (see above) in that the ribs 13 are pressed into the corresponding grooves 15 of the first hollow rail part 4.

In principle, the positive fit can also already be achieved with a single rib 13. For stability reasons, however, it is advantageous if a plurality of ribs 13, i.e., at least two, preferably at least three ribs 13, extend in different directions from the main body 14.

As can be seen in FIG. 2, the alignment piece 8 and the fixing piece 9 may be combined with one another to form an easy-to-handle alignment and connection unit, for example, by both pieces 8, 9 being interlocked with one another in a suitable manner. Thus, the (pre-)assembly or disassembly can be further simplified.

In a third step, a clamping tool 16 is fastened to the hollow rail parts 4, 5 (see FIG. 1). In this example, the clamping tool 16 comprises two first clamping elements 17*a* and two second clamping elements 17*b*, wherein each first clamping element 17*a* is fastened to the first hollow rail part 4 and each second clamping element 17*b* is fastened to the second hollow rail part 5.

The clamping elements 17*a*, 17*b* can expediently be positioned on the corresponding hollow rail part 4 or 5 so that, after the alignment of the hollow rail parts 4, 5, they are opposite one another in pairs on different sides of the hollow rail parts 4, 5, i.e., such that precisely one second clamping element 17*b* is opposite each first clamping element 17*a*.

By way of example, in the view shown in FIG. 1, two clamping elements 17*a*, 17*b* are fastened to a left side of the hollow rail parts 4, 5 and two clamping elements 17*a*, 17*b* are fastened to a right side of the hollow rail parts 4, 5. It is thus prevented that the hollow rail parts 4, 5 cant when subsequently being brought together to form the hollow rail 3.

As indicated in FIG. 1 using the example of the (upper) second clamping elements 17*b*, each clamping element 17*a*, 17*b* can be hooked into the corresponding hollow rail part 4 or 5 in a positive fit, for example, into corresponding slots in each hollow rail part 4 or 5. This allows for a tool-free and thus particularly simple (dis)assembly of the clamping elements 17*a*, 17*b*.

It should be noted that the third step can be carried out before or after the second step.

In a fourth step, the clamping elements 17*a*, 17*b* of each pair are subjected to forces in opposite directions parallel to the common longitudinal axis 12.

In the simplest case, this can take place in that a threaded rod 18 is passed through corresponding receptacles of two opposing clamping elements 17*a*, 17*b*, and a vertical distance between the relevant clamping elements 17*a*, 17*b* is shortened by means of two nuts 19 which are moved toward one another on the threaded rod 18 by turning them accordingly. However, other means for applying the forces, for example a pneumatic or electrical actuator, are also possible.

By applying the forces, the hollow rail parts 4, 5 are moved toward one another in opposite directions and thus joined together to form the hollow rail 3, for example until they abut against one another to form a hollow rail joint (see FIG. 2).

In this process, the alignment piece 8 is pressed into the open end 7 of the second hollow rail part 5. More precisely, the ribs 13 of the alignment piece 8 are partially pressed into the corresponding grooves 15 in the open end 7 of the second hollow rail part 5.

At the end of the assembly process, the ribs 13 of the alignment piece 8 are thus pressed into both the corresponding grooves 15 of the first hollow rail part 4 and the corresponding grooves 15 of the second hollow rail part 5. This ensures a precise transition at the hollow rail joint.

A very smooth, straight hollow rail joint results, in particular when the alignment piece 8, or at least its ribs 13, is/are made of a less hard, i.e., softer material than the two hollow rail parts 4, 5 and/or the fixing piece 9, in particular of a metallic material that is not as hard as steel.

In tests, particularly good results could be achieved with an alignment piece 8 in the form of an aluminum part. In this case, flatness at the hollow rail joint of plus/minus 0.1 mm could be achieved without additional post-processing.

Furthermore, when the two hollow rail parts 4, 5 are brought together, the second longitudinal portion 11 of the fixing piece 9 can be inserted completely into the second hollow rail part 5.

In a fifth step, the hollow rail parts 4, 5, which are aligned relative to one another and brought together, can be fixed by fixing the first hollow rail part 4 to the first longitudinal portion 10 of the fixing piece 9 and fixing the second hollow rail part 5 to the second longitudinal portion 11 of the fixing piece 9, for example, each with a plurality of bolts 20.

After fixing, the clamping tool 16 can be removed again from the hollow rail 3 in a sixth step. For this purpose, the clamping elements 17*a*, 17*b* can easily be unhooked again from the corresponding hollow rail part 4 or 5.

Finally, it should be noted that terms such as "having," "comprising," etc. do not exclude other elements or steps, and indefinite articles such as "a" or "an" do not exclude a plurality. Furthermore, it is noted that features or steps described with reference to one of the preceding embodiments can also be used in combination with features or steps described with reference to other of the above embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for assembling a hollow rail for guiding an elevator car and/or a counterweight of an elevator installation, the method comprising the steps of:

arranging a first hollow rail part and a second hollow rail part at different heights in an elevator shaft of the elevator installation;

aligning the first hollow rail part relative to the second hollow rail part by an alignment piece such that the first hollow rail part and the second hollow rail part extend along a common longitudinal axis, wherein the alignment piece is arranged between the first hollow rail part and the second hollow rail part such that the alignment piece protrudes partially into an open end of the first hollow rail part and protrudes partially into an open end of the second hollow rail part;

fastening a first clamping element to the first hollow rail part and fastening a second clamping element to the second hollow rail part; and applying forces to the first and second clamping elements in opposite directions parallel to the common longitudinal axis thereby bringing together the first hollow rail part and the second hollow rail part to form the hollow rail, wherein the alignment piece is pressed into the open end of the first hollow rail part and/or into the open end of the second hollow rail part.

2. The method according to claim 1 including:

hooking each of the first and second clamping elements into the first and second hollow rail parts respectively to fasten the first and second clamping elements to the first and second hollow rail parts respectively; and unhooking the first and second clamping elements from the first and second hollow rail parts when the first hollow rail part and the second hollow rail part have been brought together to form the hollow rail.

3. The method according to claim 1 including arranging the alignment piece to positively engage in each of the open ends and prevent the first hollow rail part from rotating about the common longitudinal axis relative to the second hollow rail part.

4. The method according to claim 3 wherein the alignment piece has a main body and at least one rib extending from the main body, and wherein the at least one rib positively engages in a groove of the first hollow rail part and in a groove of the second hollow rail part.

5. The method according to claim 3 wherein the alignment piece has a main body and at least three ribs extending from the main body in different directions and wherein each of the at least three ribs positively engages in corresponding grooves of the first hollow rail part and the second hollow rail part.

6. The method according to claim 1 including:

arranging an elongated fixing piece between the first hollow rail part and the second hollow rail part such that a first longitudinal portion of the fixing piece protrudes into the open end of the first hollow rail part and a second longitudinal portion of the fixing piece protrudes into the open end of the second hollow rail part; and fixing the first and second hollow rail parts together by fixing the first hollow rail part to the first longitudinal portion and fixing the second hollow rail part to the second longitudinal portion.

7. The method according to claim 6 Including fixing by bolting the first hollow rail part to the first longitudinal portion and/or by bolting the second hollow rail part to the second longitudinal portion.

8. The method according to claim 6 including removing the first and second clamping elements after the fixing.

9. The method according to claim 6 wherein the fixing piece is held by the alignment piece.

10. The method according to claim 9 wherein the fixing piece is held between the first longitudinal portion and the second longitudinal portion by the alignment piece.

11. The method according to claim 9 wherein the fixing piece is interlocked with the alignment piece.

12. The method according to claim 1 wherein the alignment piece is made of a softer material than a material of the first hollow rail part and/or a material of the second hollow rail part.

13. The method according to claim 1 wherein the alignment piece is an aluminum part.

14. A clamping tool for use in performing the method according to claim 1 the clamping tool comprising:

the first clamping element adapted to be fastened to the first hollow rail part and the second clamping element adapted to be fastened to the second hollow rail part; and a means for applying the force to the first clamping element fastened to the first hollow rail part and the force to the second clamping element fastened to the second hollow rail part, the forces being applied in opposite directions parallel to the common longitudinal axis of the first hollow rail part and the second hollow rail part such that the first hollow rail part and the second hollow rail part are moved toward one another.

15. The clamping tool according to claim 14 wherein the first clamping element is adapted to hook into the first hollow rail part to fasten the first clamping element to the first hollow rail part and/or wherein the second clamping element is adapted to hook into the second hollow rail part to fasten the second clamping element to the second hollow rail part.

* * * * *